Sept. 10, 1957 B. F. MONROE ET AL 2,805,904
FOLDING SERVICE TRAY
Filed Jan. 23, 1956 3 Sheets-Sheet 1
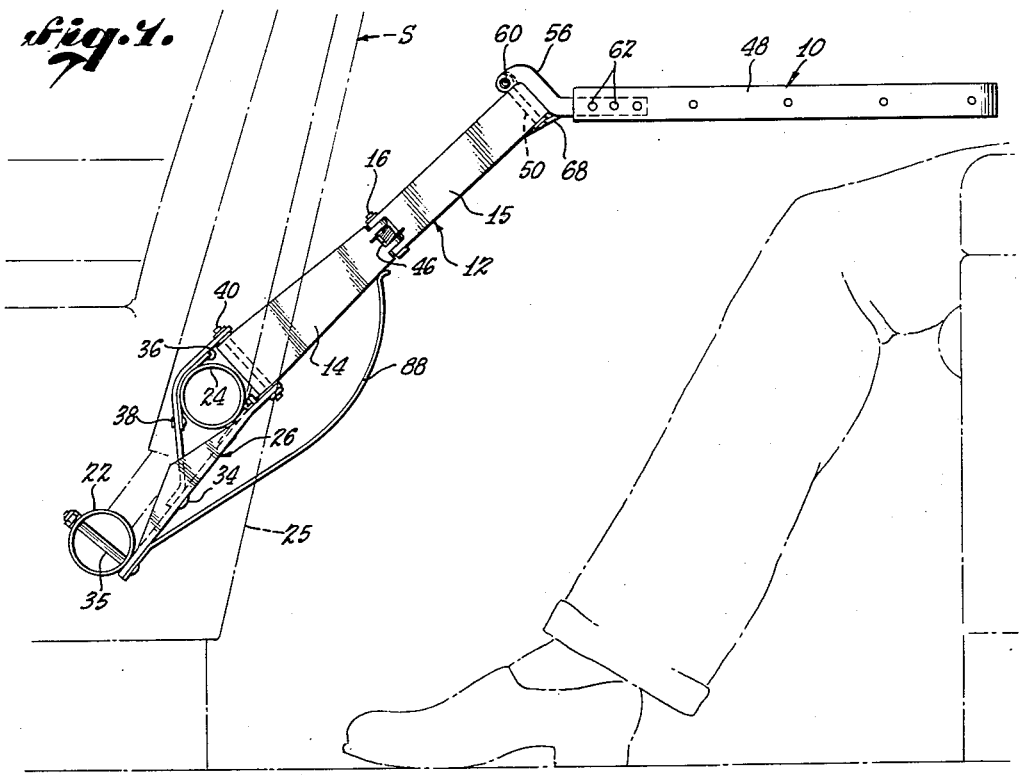
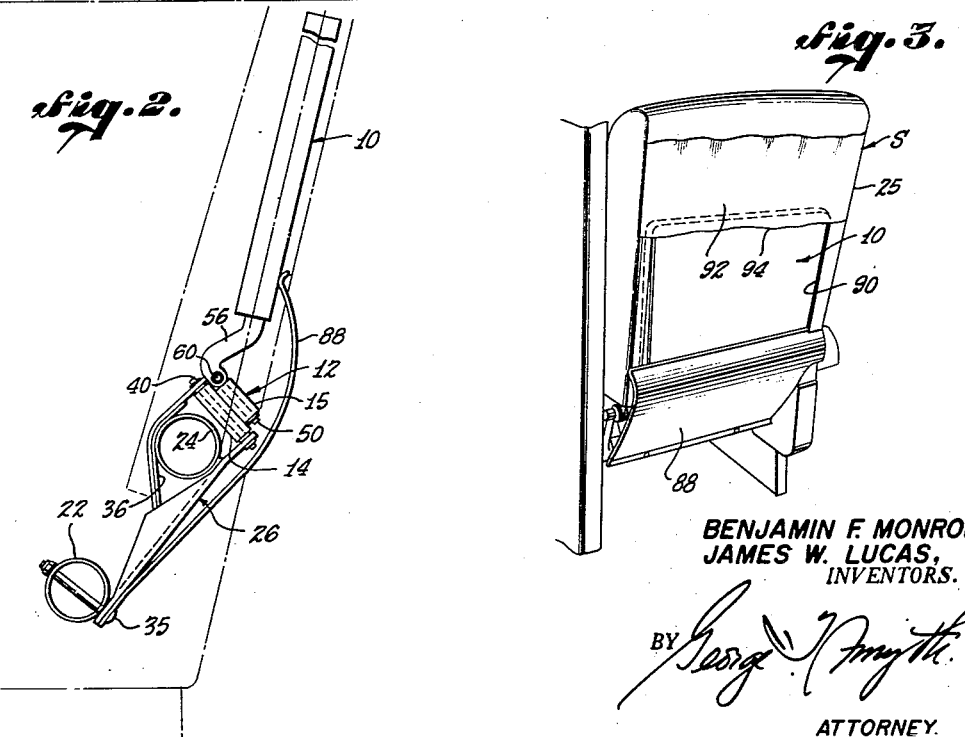
BENJAMIN F. MONROE &
JAMES W. LUCAS,
INVENTORS.
BY [signature]
ATTORNEY.

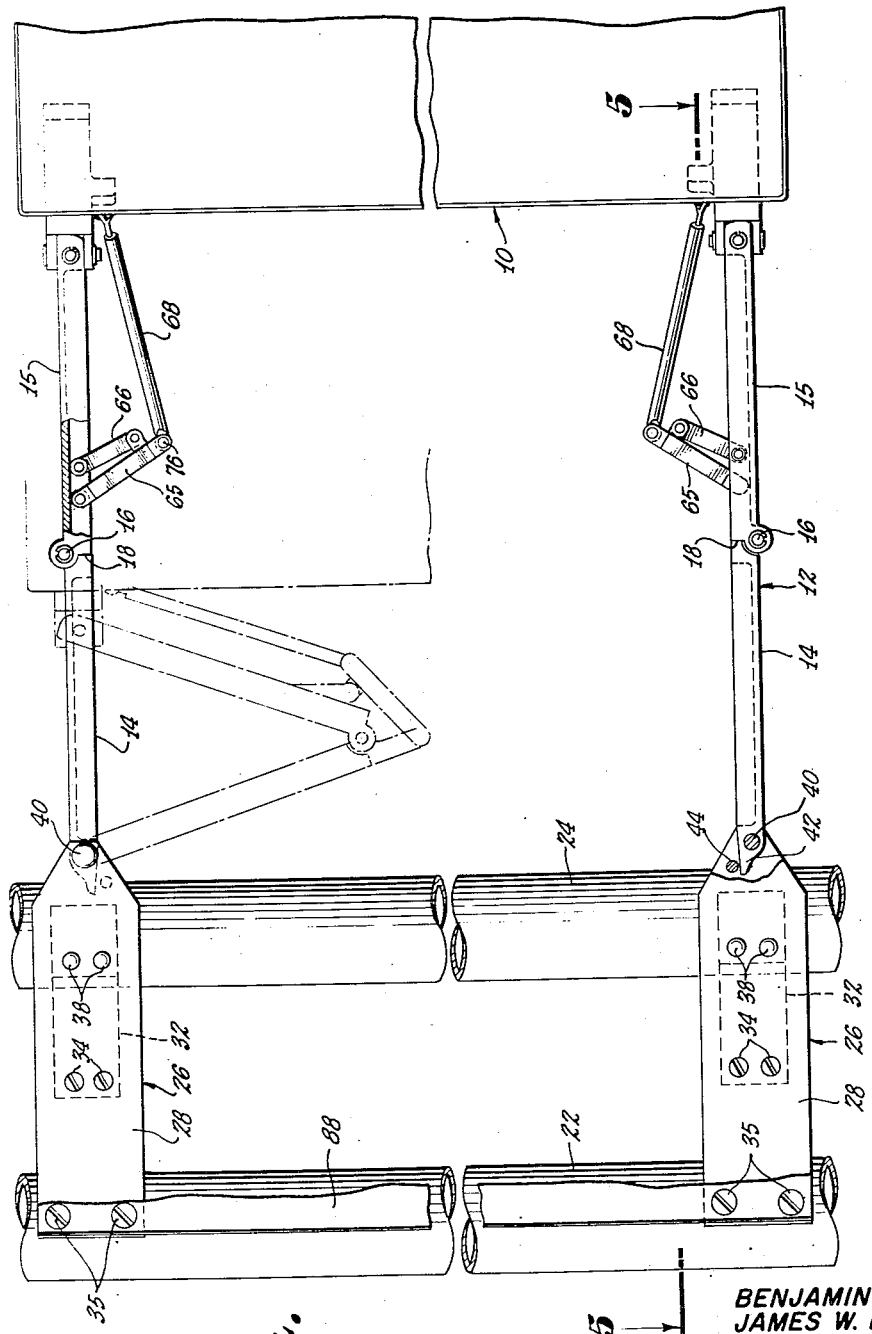

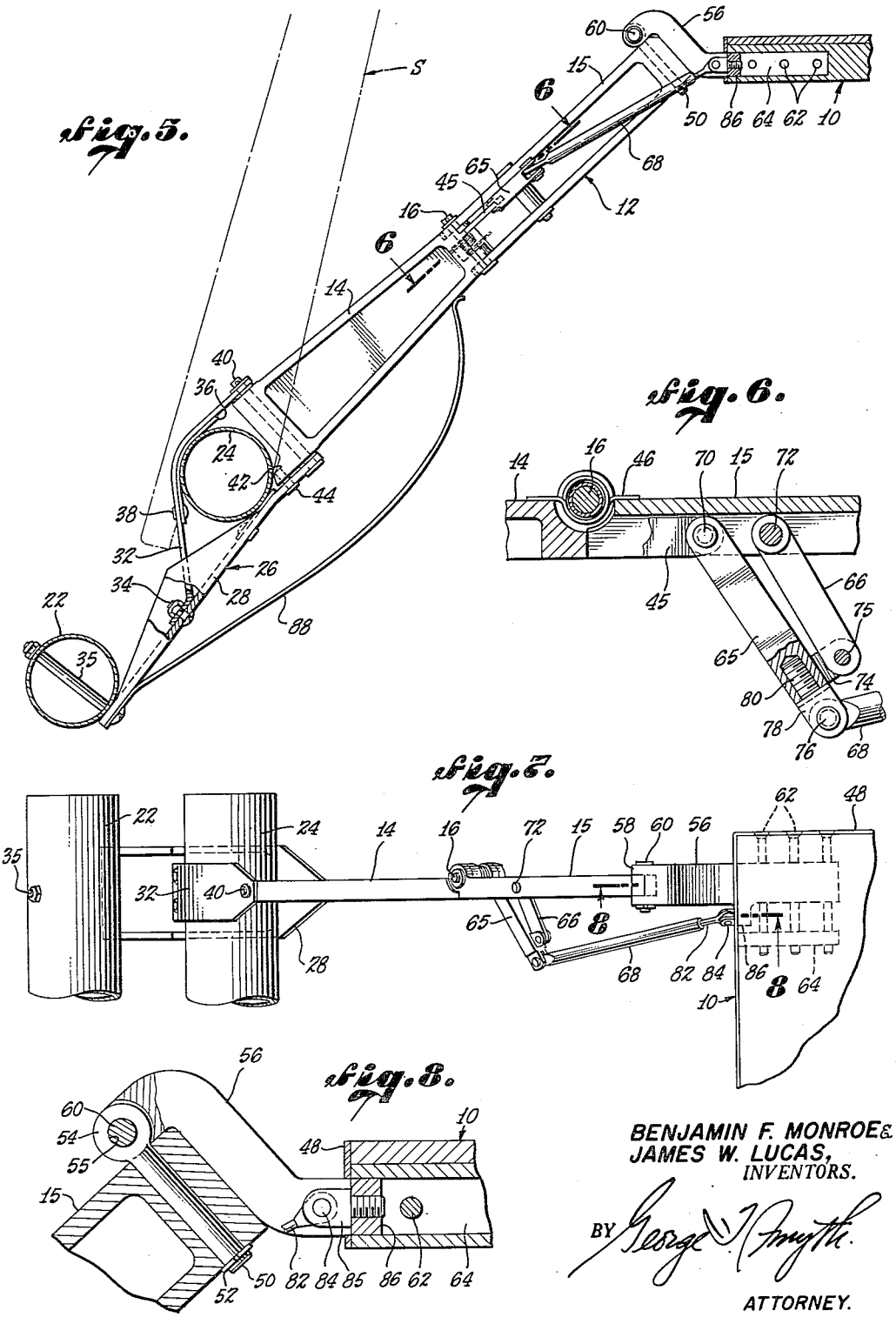

United States Patent Office 2,805,904
Patented Sept. 10, 1957

2,805,904

FOLDING SERVICE TRAY

Benjamin F. Monroe, Beverly Hills, and James W. Lucas, Santa Monica, Calif., assignors to Hardman Tool & Engineering Co., Los Angeles, Calif.

Application January 23, 1956, Serial No. 560,698

15 Claims. (Cl. 311—21)

This invention relates to a tray assembly for use by a seated person, which tray assembly is mounted on an upwardly extending support forward of the seated person for movement between a serving position extending towards the person and a retracted position that is out of the way and against the forward support.

While the invention is widely applicable for its purpose, it has special utility for use in a passenger vehicle such as a passenger airplane, the retractable tray assembly being mounted on the back of one seat, which may be termed the forward seat, for use by the occupant of the next seat to the rear, which may be termed the rearward seat. Such a practice of the invention is described herein by way of example and will provide adequate guidance to those skilled in the art who may have occasion to apply the same principles to other specific purposes.

It is contemplated that the tray assembly will be entirely supported by the forward seat to avoid any necessity whatsoever either for support from the floor of the vehicle or for cooperating support by the rearward seat. Thus the tray assembly in its serving position permits maximum freedom for movement by the user and does not require special adaptation of the rearward seat for cooperating support of the tray.

To carry out this concept, the tray assembly comprises an articulated cantilever frame and a tray pivotally mounted on the outer end thereof, the cantilever frame being mounted on the back of the forward seat at a relatively low region thereof to extend upward in a plane inclined rearward from the back rest of the forward seat. A special advantage of this arrangement is that it avoids the necessity for any diagonal braces above the level of the tray. Such braces have been used in some instances heretofore and have often caused accidents in the serving of food.

The invention is further characterized by the concept of the tray assembly retracting when out of service into an unobstrusive position nested into the structure of the forward seat. Thus the retracted tray assembly may have the appearance of being an integral part of the back rest of the forward seat. In this regard, a feature of the invention is that the cantilever frame collapses downward in its inclined plane in a manner to shorten the overall length of the tray assembly to substantially less than the length of the back rest of the forward seat. This shortening collapse of the cantilever frame not only places the retracted assembly at a desirably low level but also simplifies the problem of nesting the tray assembly into the back rest of the forward seat.

In the preferred practice of the invention, the back rest of the forward seat is recessed from the rear to substantially the depth of the tray and the tray fits into this recess with the underside of the tray outermost. The underside of the tray may have a facing that matches the cover material of the back rest to further the visual impression that the tray is an integral part of the forward seat.

A further feature of the preferred practice of the invention with reference to the blending of the retracted tray assembly into the structure of the forward seat is the provision of a sheet of flexible material that is suitably supported in a position to cover and conceal the lower end of the cantilever frame. Such a sheet member, which may be made of a suitable plastic, blends with the back rest and is further conducive to the impression that the exposed parts of the retracted tray are integral parts of the back rest.

One problem that is encountered in the construction of such a tray assembly is to simplify the manual operation of folding and unfolding the assembly. This problem is met by operatively connecting the tray with the collapsible cantilever frame in such manner that pivotal movement of the tray relative to the cantilever frame causes the desired collapse or extension of the cantilever frame. Thus it is merely necessary to swing the retracted tray away from the back rest with one hand to cause the desired unfolding extension of the cantilever frame, the tray reaching its horizontal serving position simultaneously with the full extension of the cantilever frame. Conversely, merely swinging the tray upward and forward from its horizontal serving position causes automatic collapse of the cantilever frame and automatic guidance of the tray to its nested position in the back rest of the forward seat. A special feature of the invention is that the tray in its serving position locks the cantilever frame in its extended position.

A further problem in the mounting of such a folding tray assembly on the back of a vehicle seat is to keep the retracted tray from unfolding by inertia when the vehicles is subject to sudden forward acceleration. Such an unfolding action may be especially hazardous in an airplane or bus. This problem is met by providing latch means to releasably hold the retracted tray member against the back rest of the forward seat. A feature of the preferred practice of the invention is that the back rest is provided with a flexible pocket to enclose the edge of the retracted tray member for this purpose, the rim of the pocket being made of elastic material.

One of the most important considerations in the use of such folding trays in airplanes is the safety of the passenger in the event a crash occurs. In its folded state the present tray assembly is low enough to avoid the danger of hazardous impact by the passenger in the seat rearward thereof. No metal guides or rails for the tray are in the seat immediately in front of the passenger. When the tray is unfolded, it is safe because the tray proper is made of non-hazardous plastic and none of the supporting framework is hazardously located.

The various features and advantages of the invention may be understood from the following detailed description taken with the accompanying drawings.

In the drawings, which are to be regarded as merely illustrative:

Figure 1 is a side elevation of the tray assembly in fully extended position;

Figure 2 is a similar view of the tray assembly in its fully retracted position;

Figure 3 is a perspective view of the back of a seat with the tray assembly thereon in its fully retracted position;

Figure 4 is a bottom view of the tray assembly in its fully extended position;

Figure 5 is a longitudinal section taken as indicated by the line 5—5 of Figure 4 showing a longitudinal portion of the cantilever frame as viewed from inside the frame;

Figure 6 is an enlarged fragmentary section taken as indicated by the line 6—6 of Figure 5, showing the portion of the linkage that collapses and extends the cantilever frame in response to folding action of the tray;

Figure 7 is a plan view of one longitudinal half of the cantilever frame with portions broken away; and Figure 8 is an enlarged fragmentary section taken along the line 8—8 of Figure 7 showing the construction of one of the two universal joints by means of which the tray is mounted on the outer end of the cantilever frame.

The embodiment of the tray assembly shown in the drawings is for use in an airplane and is mounted on the back of a seat, generally designated S, for use by the occupant of the next seat rearward therefrom. The tray assembly includes a tray, generally designated by numeral 10, and an articulated cantilever frame, generally designated 12, which frame comprises two laterally spaced pairs of knee-action links. Each pair of knee-action links comprises a lower link 14 and an upper link 15, both of which are castings or forgings that are channel-shaped in cross-sectional configuration.

Each pair of knee-action links is fully extendable as shown in Figures 1 and 4 and each is collapsible inwardly towards the other as indicated by dotted lines in Figure 4. The two knee-action links of each pair are hingedly interconnected by a hinge pin 16, the axis of which is the axis of knee action. Preferably, the adjacent ends of the two knee-action links 15 and 14 of each pair abut at the fully extended positions of the links as indicated by the line 18 in Figures 4 and 6.

The particular seat S shown in the drawings has a fixed base structure that includes a first transverse tubular member 22 at the back of the seat cushion and a second transverse tubular member 24 at the lower end of the back rest 25 of the seat. The first transverse seat member 22 is fixed but the second transverse seat member 24 rotates for pivotal action of the back rest 25 as the back rest is moved adjustably through the usual range of inclined positions.

In the present construction of the tray assembly, each of the two pairs of knee-action links 14 and 15 is attached to the two transverse seat members 22 and 24 by a suitable bracket that is generally designated by numeral 26. Each of the brackets 26 comprises a lower longitudinally flanged member 28 together with an angular member 32 which is joined thereto by suitable screws 34 as best shown in Figure 5. Thus each bracket 26 forms a fork which frictionally embraces the upper transverse seat member 24. The lower end of the bracket 26 is fixedly attached to the lower transverse seat member 22 by suitable screws 35 that extend diametrically through the seat member.

The frictional engagement of the bracket 26 with the upper transverse seat member 24 permits this transverse seat member to rotate freely as required for changes in inclination of the back rest 25. Preferably, antifriction liner strips 36 are secured by rivets 38 to each bracket 26 in the regions of contact with the periphery of the transverse seat member 24. These liner strips may be made of a suitable plastic material having a low coefficient of friction with respect to the metal surface of the transverse seat member 22.

The upper forked end of each of the brackets 26 is spanned by a pivot bolt 40 mounted therein and the lower end of the corresponding knee-action link 14 is pivotally mounted on this bolt. As can be seen in Figure 5, both the axis of the pivot bolt 40 and the knee-action axis provided by the hinge pin 16 are perpendicular to the inclined plane in which the cantilever frame 12 extends at its fully unfolded position. Thus the collapsing action of the two pairs of knee-action links 14 and 15 occurs in this inclined plane.

Preferably, suitable stop means is provided to limit the range of swing of the lower knee-action links 14 to lend rigidity to the fully extended cantilever frame. For this purpose, each of the two lower knee-action links 14 may be provided with a stop finger 42 at its lower end, as best shown in Figure 5, for abutment against a stop pin 44 that is fixedly mounted on the lower member 28 of the corresponding bracket 26. It can be seen in Figure 4 that the two stop pins 44 on the two brackets 26 are positioned in opposition to each other to oppose side sway of the fully extended tray assembly.

For further promotion of rigidity in the extended cantilever frame 12, it is contemplated that one of the two knee-action links 14 and 15 of each pair will have an end portion extending past the knee-action pivot pin 16 in overlapping abutment against the other of the two knee-action links when the knee-action links are at their fully extended positions. Thus, as best shown in Figures 5 and 6, an end portion of finger 45 of each of the lower knee-action links 14 extends past the hinge pin 16 to lie against the inner side of the corresponding upper knee-action link 15 at the fully extended positions of the two knee-action links. Preferably, a suitable torsion spring 46 is wrapped around each of the hinge pins 16 with the ends of the spring bearing against the two knee-action links 14 and 15 to urge the two knee-action links to their extended or unfolded positions with the finger 45 in abutment against the upper knee-action link 15.

The tray 10 is preferably made of material that will yield readily in the event of an airplane crash thereby to prevent serious injury to a person who may be using the tray. In this instance, the tray 10 is of laminated plastic construction, the plastic material being largely relatively soft and frangible expanded or foamed plastic. This laminated structure may be surrounded by a thin pliable metal rim band 48.

The tray 10 is mounted on the upper ends of the upper knee-action link 15 by suitable universal joint means which not only permit the collapsing action of the knee-action links but also permit the tray to be swung pivotally through the required range of angles relative to the knee-action links. In the universal joint construction shown in the drawings, a pivot pin 50 is journalled in the upper end of each upper knee-action link 15, as best shown in Figure 8, the pivot pin being provided with a suitable split-ring retainer 52. The pivot pin 50 has an enlargement 54 at its upper end with a transverse bore 55 therein for pivotal mounting of the tray.

The forward edge of the tray is provided with two spaced angular arms 56 each of which terminates in a pair of spaced ears 58 to straddle the corresponding pivot pin 50 and a second transverse pivot pin 60 extends through these ears and through the transverse bore 55. It can be seen that this arrangement provides a universal joint having two axes perpendicular to each other, one axis being provided by the pivot pin 50 and the other axis being provided by the pivot pin 60. It may be further noted that the two angular arms 56 rest against the upper ends of the corresponding upper knee-action link 15 when the tray 10 is in its horizontal serving position.

In the construction shown, each of the angular arms 56 is embedded in the plastic material of the tray 10 and is secured therein by a plurality of long transverse screws 62, as best shown in Figures 5 and 7. The screws 62 extend through the rim band 48 and are threaded into an embedded anchor member 64.

As heretofore indicated, it is contemplated that the tray 10 will be operatively connected to the cantilever frame 12 in such manner that the swinging movement of the tray will collapse and extend the cantilever frame and, moreover, when the tray is in its extended serving position, it will lock the cantilever frame in its extended position. For this purpose a pair of operating links 65 and 66 and a cooperating operating rod 68 are associated with each of the two pairs of knee-action links 14 and 15.

The operating link 65 is connected to the finger or end portion 45 of the knee-action link 14 by a pivot pin 70 and, in like manner, the operating link 66 is pivotally connected to the upper knee-action link 15 by a pivot pin 72. The second end of the operating link 65 has a short lateral extension 74 to which the second end of the operating link 66 is connected by a pivot pin 75. The second end of the operating link 65 is connected to the operating rod 68 by a pivot pin 76. In the construction shown, the pivot pin 76 extends through a clevis 78 having a threaded shank 80 by means of which the clevis is mounted on the end of the operating link 65 as an extension thereof.

The second end of the operating rod 68 is connected to the tray 10 by a suitable universal joint. For this purpose, the upper end of the operating rod 68 has a swiveled extension 82 that is connected by a transverse pivot pin 84 to a clevis member 85 (Figure 8). The clevis member 85 has a threaded shank by means of which it is anchored to a lateral projection or lug 86 (Figures 7 and 8) of the corresponding angular arm 56.

The preferred practice of the invention further includes a yielding guard in the form of a flexible sheet 88 of plastic material that conceals the collapsed cantilever frame 12 and furthers the impression that the retracted tray assembly is an integral part of the seat on which it is mounted. The flexible sheet 88 may be mounted either on the back of the seat S or on the tray assembly. In the construction shown, the sheet 88 is anchored to the lower transverse tubular seat member 24 by the same bolts 35 that anchor the two brackets 26. When the tray assembly is completely retracted, the flexible sheet 88 presses against the back of the tray 10 as shown in Figures 2 and 3 and in this position completely conceals the two pairs of collapsed knee-action links. When the tray is fully extended, the sheet 88 is flexed outward by the two pairs of extended knee-action links.

The back rest 25 of the seat S has a large rectangular recess 90 therein as shown in Figure 3, which recess is of the same configuration as the tray 10 and is of substantially the same depth as the thickness of the tray. At its fully retracted position, the tray 10 nests into the rectangular recess 90 substantially flush with the rear surface of the back rest 25 and thus gives the impression of being an integral part of the seat. To further this impression, the exposed under surface of the tray may be covered with material matching the covering material of the back rest.

Any suitable latch means may be provided to releasably retain the tray 10 in the rectangular recess 90 for the purpose of preventing the tray assembly from unfolding in response to forward acceleration of the aircraft. Instead of a metal latch for this purpose, the present embodiment of the invention includes a fabric pocket 92 on the back rest 25, which pocket has an elastic rim 94. The elastic rim 94 may be lifted manually to receive the upper end of the tray 10 and readily slips down over the edge of the tray to engage and retain the tray in the recess 90 in a releasable manner.

The operation of the described tray assembly for its purpose may be readily understood from the foregoing disclosure. It can be seen in Figure 3 that the retracted tray assembly is completely out of the way and appears to be an integral part of the structure of the seat S. When it is desired to use the tray 10, the elastic rim 94 of the fabric pocket 92 is raised to release the nested tray and the tray is swung backward from the seat S to its fully extended horizontal position. This rearward unfolding operation of the tray may be carried out by one hand.

As the tray 10 swings towards its horizontal serving position, the two operating rods 68 are thereby pushed downward to actuate the two operating links 66 and 65 to cause the two pairs of collapsed knee-action links 14 and 15 to extend or unfold, this action being encouraged by the two torsion springs 46. As the tray reaches its fully extended horizontal serving position with the angular arms 56 of the tray resting flat against the upper ends of the upper knee-action links 15, the knee-action links reach their fully extended positions with the end portions or fingers 45 of the lower knee-action links 14 flat against the webs of the upper knee-action links 15. The weight of the tray holds it in its extended service position and acting through the two operating rods 68 locks the two pairs of knee-action links 14 and 15 in their fully extended positions.

To return the tray assembly to its retracted position, it is merely necessary to lift the free end of the tray 10 with one hand to swing the tray towards the back rest 25. The lifting of the tray exerts pull on the two operating rods 68 and the two operating rods acting through the operating links 65 and 66 cause the two pairs of knee-action links to collapse inward towards each other in opposition to the torsion springs 46. As the tray reaches its fully retracted position in the seat recess 90 the two pairs of knee-action links 14 and 15 collapse out of sight behind the flexible guard sheet 88.

When the tray is in its fully extended position, there are no supporting obstructions either directly above or directly below the tray. The extended tray is at the optimum position for the convenience of the user. Since the tray is at a relatively low position both in its extended position and in its retracted position, it is not a hazard in the event of a crash or sudden deceleration of the aircraft. The fact that the tray 10 itself is made of material that readily yields on impact further reduces the hazard to the user.

An important advantage of the tray assembly is that in its extended position, it is rearwardly inclined sufficiently to be entirely outside the range of inclination adjustment of the back rest 25. Thus the tray assembly does not interfere with inclination adjustment of the back rest and the tray may be used even when the back rest is at its maximum rearward inclination.

Our description in specific detail of the presently preferred embodiment of the invention will suggest various changes, substitutions and other departures from our disclosure that properly lie within the spirit and scope of the appended claims.

We claim:

1. A tray assembly mounted on the back of a seat having a fixed base structure and a back rest that is adjustable through a range of angles of inclination, said tray assembly comprising: bracket means mounted on said fixed base structure; an articulated cantilever frame mounted on said bracket means, said frame being movable between a collapsed position adjacent said second transverse member and an upwardly extending inclined position outside said range of angles; a tray pivotally mounted on the upper end of said frame to swing between a substantially horizontal serving position when said frame is extended and a second position against said back rest when the frame is collapsed; and means operatively connecting said tray to said frame to collapse the frame in response to pivotal movement of the tray from its horizontal serving position to its second retracted position and vice versa.

2. A tray assembly as set forth in claim 1 in which said bracket means frictionally embraces said second transverse member to permit rotation of the second transverse member in the pivotal movement of the back rest.

3. In a tray assembly mounted on an upwardly extending support, the combination of: an articulated cantilever frame comprising two laterally spaced pairs of upper and lower knee-action links collapsible inwardly towards each other, said links being movable in an inclined plane between collapsed positions adjacent a lower region of said support and an upwardly extending position inclined away from the support; a tray pivotally mounted on the upper ends of said two pairs of links to swing between a substantially horizontal serving position when said pairs of links are extended and a second position against said support when said pairs of links are collapsed; and means operatively connecting said tray to both said pairs of links to lock the links in their extended positions when the tray is in its serving position and to collapse the pairs of links in response to pivotal movement of the tray from its horizontal serving position to its second position.

4. A tray assembly as set forth in claim 3 in which said operatively connecting means comprises a pair of operating links and an operating rod for each pair of knee-action links, said operating links being connected respectively to the two knee-action links, said operating rod connecting said tray with both of said operating links for actuation thereof.

5. A tray assembly as set forth in claim 3 in which said tray is connected to each of said pairs of knee-action links by a universal joint.

6. A tray assembly as set forth in claim 5 in which each of said universal joints includes a pivot pin in the corresponding upper knee-action link, said pivot pin being perpendicular to said inclined plane; and in which said tray is pivotally connected to said pivot pin to swing about an axis perpendicular to the axis of the pivot pin.

7. A tray assembly mounted on the back of a vehicle seat for use by a seat occupant rearwardly therefrom, said tray assembly comprising: two spaced pairs of knee-action links, each pair comprising a lower link and an upper link connected together to hinge about a knee axis for extension and collapse of the links in an upward plane inclined rearward from said seat, each of the lower links of said two pairs being mounted at its lower end on the back of said seat at a relatively low region thereof for hinge action about an axis perpendicular to said plane; a tray connected to the upper ends of said two upper knee-action links by universal joints for pivotal movement between a substantially horizontal position when said two pairs of links are extended and a retracted position against the back of said seat when the knee-action links are retracted; and means operatively connecting said tray to each of said pairs of knee-action links for collapse and extension of the links in response to changes in the angle of the tray relative to said plane.

8. A tray assembly as set forth in claim 7 which includes spring means at each of said knee axes to urge the knee-action links to their extended positions.

9. A tray assembly as set forth in claim 7 in which each of said universal joints has a one pivot axis perpendicular to said plane and a second pivot axis substantially parallel to said plane.

10. A tray assembly as set forth in claim 9 in which one of said knee-action links of each pair of knee-action links has an end portion extending past the corresponding knee axis to swing into abutment with a portion of the other knee-action link at the extended positions of the knee-action links.

11. A tray assembly as set forth in claim 10 in which said operatively connected means comprises a pair of operating links and an operating rod for each pair of knee-action links, said operating links being connected respectively to the two knee-action links, said operating rod connecting said tray with both said operating links for actuation thereof.

12. A tray assembly as set forth in claim 11 in which one of said operating links is pivotally connected to said operating rod, said one operating link having a lateral extension; and in which the other of said operating links is pivotally connected to said lateral extension.

13. A tray assembly as set forth in claim 7 which includes means to releasably retain said tray against the back of said seat.

14. A tray assembly as set forth in claim 7 in which the back of said seat is provided with a pocket to receive the upper end of said tray member at the retracted position of the tray assembly, said pocket having an elastic rim to yieldably retain said tray member.

15. A tray assembly as set forth in claim 1, which includes yielding sheet means extending upward from said fixed base structure to conceal said articulated cantilever frame when the frame is in its collapsed position.

References Cited in the file of this patent

UNITED STATES PATENTS

| | | |
|---|---|---|
| 1,780,706 | Goldbecher | Nov. 4, 1930 |
| 2,098,426 | McDonald | Nov. 9, 1937 |
| 2,132,279 | Wicknick, et al. | Oct. 4, 1938 |
| 2,520,789 | Weiss | Aug. 29, 1950 |
| 2,565,187 | Udell | Aug. 29, 1950 |
| 2,635,678 | Basil | Apr. 21, 1953 |